United States Patent [19]

Rupprecht et al.

[11] Patent Number: 4,540,149
[45] Date of Patent: Sep. 10, 1985

[54] STAND FOR A DRILLING TOOL

[75] Inventors: Hans Rupprecht, Munich; Franz Hoyss, Bad Tölz, both of Fed. Rep. of Germany

[73] Assignee: Hilti Aktiengesellschaft, Schaan, Fed. Rep. of Germany

[21] Appl. No.: 539,533

[22] Filed: Oct. 6, 1983

[30] Foreign Application Priority Data

Oct. 6, 1982 [DE] Fed. Rep. of Germany ....... 3237057

[51] Int. Cl.³ .............................................. F16B 7/02
[52] U.S. Cl. ..................................................... 248/669
[58] Field of Search ................. 248/669, 225.4, 231.1, 248/231.4; 403/381, 319, 379

[56] References Cited

U.S. PATENT DOCUMENTS 2,339,181 1/1944 Martin .............................. 248/316.3
2,975,647 3/1961 Kurtovich ........................... 248/669

FOREIGN PATENT DOCUMENTS 31863 7/1981 European Pat. Off. ............ 403/319
472816 6/1952 Italy .................................... 403/409

WO82/00863 3/1982 PCT Int'l Appl. .

Primary Examiner—Reinaldo P. Machado
Assistant Examiner—Alvin Chin-Shue
Attorney, Agent, or Firm—Toren, McGeady, Stanger, Goldberg & Kiel

[57] ABSTRACT

A stand for a drilling tool includes a support column with a carriage movably mounted on the column. A carrier member for a drilling tool can be secured to the carriage with support sections on the carrier member in engagement with support surfaces on the carriage. One of these support surfaces is provided by the eccentric circumferential surface on an eccentric peg which is rotatably mounted in the carriage. The support section engageable with the peg has a catch projection which prevents displacement of the carrier member from the carriage when the eccentric surface on the peg is aligned opposite the corresponding support section on the carrier member. The projection extends outwardly from the support section by an amount at least equal to the eccentricity of the circumferential surface of the peg.

4 Claims, 3 Drawing Figures

STAND FOR A DRILLING TOOL

SUMMARY OF THE INVENTION

The invention is directed to a stand for a drilling tool and includes a carrier member for the tool and a carriage supporting the carrier member with the carriage movably mounted on a support column. The carrier member has support sections engageable with support surfaces on the carriage. One of the support surfaces is formed by an eccentric surface on a peg rotatably mounted in the carriage.

In a known stand for a drilling tool of the type mentioned above, the carrier member is removable from the carriage for replacing or repairing the tool. The connection beween the carrier member and the carriage is afforded by the cooperation of an enlarging support section, known as a dove-tail section, on the carrier member and a pair of corresponding support surfaces on the carriage. While one of the support surfaces on the carriage is arranged rigidly, the other support surface can be moved relative to the support section for holding it in position.

The movable support surface is formed by the eccentric surface on a rotatable eccentric peg. The eccentric surface is pressed into engagement with the support section or it is in disengagement with the support section in accordance with the rotational movement of the eccentric peg. In the disengaged position, a flat tangential contact surface is provided on the eccentric peg opposite the support section to facilitate the outward movement of the carrier member. A disadvantage of this known arrangement is that the carrier member tends to fall from the carriage due to its own weight. To prevent the carrier member from falling off the carriage, the operator for safety reasons must hold the carrier member during rotation of the eccentric peg. The release of the carrier member which is not exactly definable due to the continuous eccentric surface on the peg, requires such caution. Generally the considerable weight of the carrier member impedes such manipulation so that it is difficult to perform without danger to the operator.

Therefore, it is the primary object of the present invention to provide a secure, safe support for the carrier member on the carriage.

In accordance with the present invention, one guide section has a catch projection at one end extending from the guide section toward the eccentric peg. The dimension of the projection extending towards the peg is larger than the eccentricity of the circumferential surface of the peg. Further, the eccentric peg can be axially displaced out of the region of the catch projection.

Due to the catch projection extending outwardly from one edge of the support section, the carrier member is held on the carriage even when the eccentric surface of the peg is disengaged from the support section. As a result, regardless of the rotational position of the eccentric peg, though its eccentric circumferential surface does not contact the support section, the carrier member is secured on the carriage. The carrier member can be removed from the carriage only by displacing the eccentric peg out of the region of the catch projection. This arrangement affords a secure support for the carrier member independent of possible wear of the eccentric peg or its support.

Preferably, the eccentric peg can be moved out of the range of the catch projection by displacing it axially. Accordingly, the entire eccentric peg can be moved out of the region of the catch projection or a support section for the peg can be left in that region. The remaining support section may be considerably tapered inwardly relative to the eccentric surface of the peg with the dimension of the support section selected so that the catch projection can be removed from the carriage without any interference.

It is advantageous if the eccentric surface of the peg which contacts the support section on the carrier member extends continuously for at least two-thirds of the circumference of the eccentric peg. With such an arrangement the wearing zone of the eccentric surface is improved relative to the known eccentric peg and, accordingly, the useful lifetime of the eccentric peg is extended.

Another advantage of a large circumferentially extending eccentric surface is the achievement of a reliable self-locking action between the eccentric surface and the support section.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
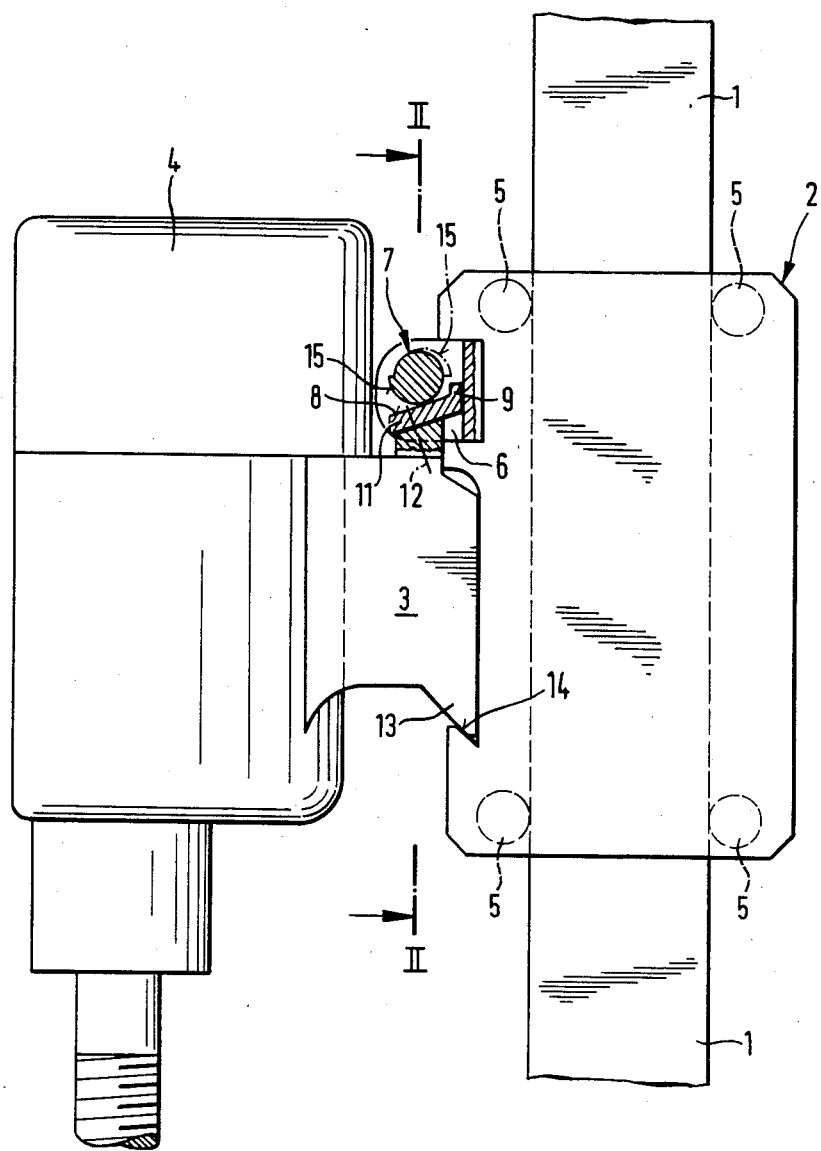
FIG. 1 is a partial elevational view, partly in section, of a stand for a drilling tool with a carrier member for the tool held in a carriage.

A stand for a drilling tool as shown in FIG. 1 includes a support column 1, a carriage 2 movably supported on the column, a carrier member 3 positioned on the carriage 2 and a drilling tool 4 fixed to the carrier member 3. As shown in dashed lines, rollers 5 movably support the carriage 2 on the column 1.

A carrying lug 6 is located on the carriage 2. An eccentric peg 7 is rotatably supported in and is axially displaceable relative to the carrying lug 6. Note in FIGS. 2 and 3 that the carrying lug 6 projects laterally outwardly from the side of the carriage 2. An eccentric peg 7 includes an eccentric surface 15 extending for more than two-thirds of the circumference of the peg. As viewed in FIGS. 2 and 3 the eccentric surface is located adjacent the left-hand end of the peg 7. By rotating the eccentric peg in the lug 6 its eccentric surface 15 can be moved into engagement with or out of engagement from a support section 8 on the carrier member 3. As viewed in FIG. 1, the right-hand side of the support section 8 has a catch projection 9 extending in the direction towards the peg 7 with the projection located laterally outwardly from the axis of the peg. The dimension of the projection outwardly from the surface of the support section facing the peg is greater than the eccentricity of the eccentric surface 15 on the peg. For technical reasons relating to production, the guide section 8 includes a plate-like section 11 secured to the carrier member 3 by fastening elements 12 shown schematically.

A second support section 13 is formed on the carrier member 3 and engages and is supported by a rigid support surface 14 on the carriage 2.

Figure 2:
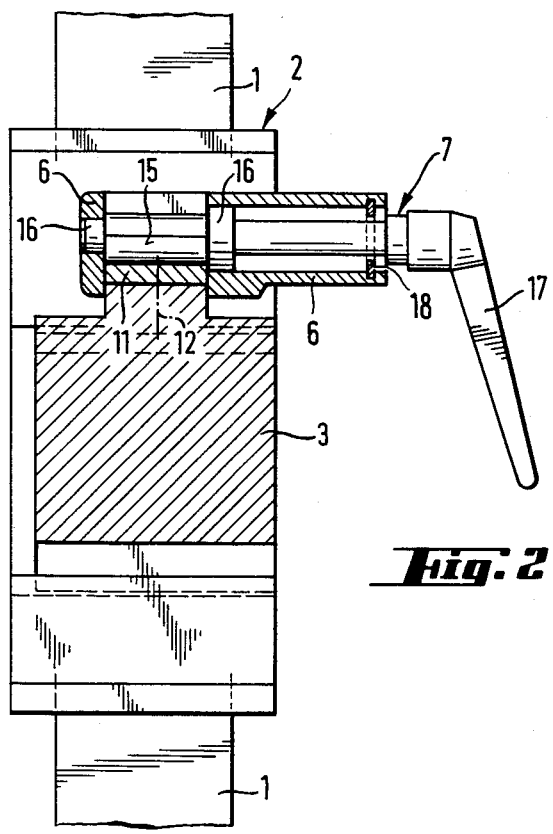
FIG. 2 is a sectional view taken along the line II—II in FIG. 1.

As shown in FIG. 2, the eccentric surface 15 of the peg 7 is located between two support parts 16 axially spaced apart on the peg. A handle 17 is located at the right-hand end of the peg 7 and serves for moving the peg.

Figure 3:
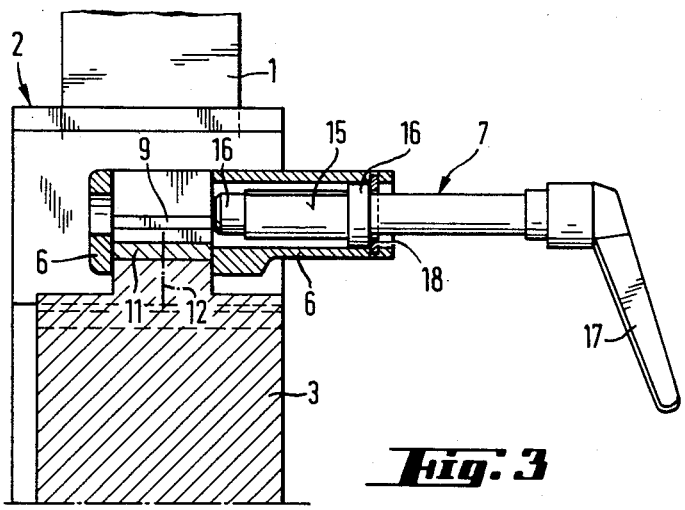
FIG. 3 is a sectional view similar to FIG. 2, however, with the eccentric peg displaced in its axial direction.

In FIG. 3, the eccentric peg 7 has been axially displaced out of the region of the catch projection 9 by rotating the eccentric surface 15 and by the subsequent axial displacement of the peg in the right-hand direction as viewed in FIG. 3. The lug 6 includes a stop ring 18 at its end spaced laterally outwardly from the carriage 2 and the stop ring limits the axial displacement of the peg in the right-hand direction. In this illustrated position of the eccentric peg 7, the carrier member 3 and the drilling tool 4 can be lifted from the carriage 2, since the eccentric surface 15 is no longer located in the region of the catch projection 9.

While specific embodiments of the invention have been shown and described in detail to illustrate the application of the inventive principles, it will be understood that the invention may be embodied otherwise without departing from such principles.

We claim:

1. Stand for drilling tool comprises an elongated support column, a carriage mounted on and displaceable in the elongated direction of said support column, a carrier member for a drilling tool, said carrier member removably mounted on said carriage, said carrier member has support sections thereon including a first support section, said carriage has support surfaces spaced apart in the elongated direction of said column and engageable with said support sections for supporting said carrier member on said carriage, said support surfaces include an axially extending eccentric peg rotatably mounted about the axis thereof on said carriage for engagement with said first support section on said carrier member, said eccentric peg extends transversely of the elongated direction of said column, said eccentric peg has an axially extending outside surface with an eccentric surface thereon extending in the circumferential direction about the axis of said peg and in the axial direction of said peg, said eccentric surface being rotatably displaceable between engagement with and disengagement from said first support section, said first support section having a support surface extending transversely of the elongated direction of said column and a catch projection spaced laterally from the axis of said peg and extending outwardly from said support surface on said first support section in the direction towards said peg for a dimension so that, with said eccentric surface of said peg located opposite and co-extensive with said support surface on said first support section, said projection prevents the removal of said carrier member out of supporting contact with said carriage, and said peg being axially displaceable relative to said support surface on said first support section so that when said peg is displaced axially out of coextension with said support surface on said first support section said carrier member can be removed from said carriage.

2. Stand for a drilling tool, as set forth in claim 1, wherein said eccentric surface extends as a smooth surface over at least two-thirds of the circumference of said eccentric peg.

3. Stand for a drilling tool, as set forth in claim 1, wherein said support surface on said first support section is a planar surface facing said eccentric peg with the eccentric surface of said peg being engageable with said planar surface and said catch projection extending outwardly from said planar surface.

4. Stand for a drilling tool, as set forth in claim 1, wherein said carriage includes a lug, said eccentric peg being axially displaceably mounted in said lug, said eccentric peg having a pair of axially spaced support parts at the opposite ends of said eccentric surface for rotatably supporting said peg within said lug when said eccentric surface thereof is located opposite and coextensive with said support surface on said first support section.

* * * * *